United States Patent [19]

Solenberger

[11] 3,941,728

[45] Mar. 2, 1976

[54] POLYVINYL ALCOHOL-POLYSACCHARIDE MICROGELS

[75] Inventor: John Carl Solenberger, Wilmington, Del.

[73] Assignee: E. I. Du Pont de Nemours and Company, Wilmington, Del.

[22] Filed: July 9, 1974

[21] Appl. No.: 486,900

Related U.S. Application Data

[63] Continuation-in-part of Ser. No. 259,666, June 5, 1972, abandoned.

[52] U.S. Cl.. 260/17 R; 260/17.4 ST; 260/91.3 VA
[51] Int. Cl.[2]... C08L 1/32; C08L 3/02; C08L 29/04
[58] Field of Search ... 260/17.4 ST, 91.3 VA, 17 R, 260/8

[56] References Cited
UNITED STATES PATENTS

| | | | |
|---|---|---|---|
| 3,318,856 | 5/1967 | Deyrup | 260/91.3 |
| 3,492,250 | 1/1970 | Deyrup | 260/2.5 |
| 3,498,869 | 3/1970 | Murakami | 260/17 R |
| 3,652,542 | 3/1972 | Hjermstad et al. | 260/17.4 ST |

*Primary Examiner*—Joseph L. Schofer
*Assistant Examiner*—Peter F. Kulkosky

[57] ABSTRACT

Mixture of polyvinyl alcohol-polysaccharide microgel in water comprising water and, based on the total mixture, about 0.1 to 10 percent by weight of a partially crosslinked mixture of polyvinyl alcohol and polysaccharide in which the mixture is partially crosslinked with titanium ions, said polyvinyl alcohol being present in an amount of 0.05 to 9.95 percent by weight, said polysaccharide being present in the amount of about 0.05 to 9.95 percent by weight and being selected from the group consisting of about 0.05 to 9.95 percent by weight of starch and about 0.05 to 3 percent by weight of sodium carboxymethylcellulose, said microgel being a stable fluid derived from polyvinyl alcohol which has a Hoeppler viscosity of about 4 to 150 centipoises and in which at least about 50 mole percent of the monomeric units are vinyl alcohol units, the water and partially crosslinked mixture of polyvinyl alcohol and polysaccharide having a Brookfield viscosity of about 1.15 to 1000 centipoises, the viscosity being at least about 15 percent greater than the viscosity of the aqueous polyvinyl alcohol-polysaccharide mixture from which the microgel is derived. The microgels are useful as size for paper, as paper coatings, as warp size for textile fibers, and as adhesives.

8 Claims, No Drawings

POLYVINYL ALCOHOL-POLYSACCHARIDE MICROGELS

CROSS-REFERENCE TO RELATED APPLICATION

This is a continuation-in-part of application Ser. No. 259,666, filed June 5, 1972, now abandoned.

BACKGROUND OF THE INVENTION

1. Field of the Invention

This invention relates to polyvinyl alcohol microgels and their use as paper and paperboard sizes, in paper and paperboard coatings, as textile warp sizes, as adhesives, and as soil and dust stabilizers.

2. Description of the Prior Art

Certain materials such as starch, sodium carboxymethyl cellulose, sodium alginate, and polyvinyl alcohol, with or without the addition of clay, have been used as surface sizes for paper and paperboard. By "surface size" is meant a material which is applied to the surface of the paper or paperboard, thereby forming a barrier which prevents or retards wicking and absorption of ink and other fluids into the paper or paperboard. Surface sizes are to be distinguished from internal sizes which are added in the process of making the sheet.

Although polyvinyl alcohol is many times more expensive than starch on a per pound basis, it has been shown that polyvinyl alcohol can perform as well as, or in many cases, better than starch as a surface size for paper or paperboard on an equal cost basis. However, in most use areas the improvement in performance has not been sufficient to cause former starch users to switch to polyvinyl alcohol. At present polyvinyl alcohol is definitely preferred to starch only in specialty areas where quality is important.

There is evidence that polyvinyl alcohol solutions readily penetrate into paper and paperboard. It is felt that even better performance for polyvinyl alcohol would be demonstrated if its "hold out" characteristics could be improved; that is, if penetration of polyvinyl alcohol size solutions into paper and paperboard could be substantially reduced or eliminated.

In a copending application of Alden J. Deyrup, Ser. No. 259,552, filed June 5, 1972, polyvinyl alcohol microgels are described which exhibit improved hold out characteristics over aqueous polyvinyl alcohol solutions. These microgels are stable fluids comprising water and polyvinyl alcohol partially crosslinked with tetravalent titanium ions and having a Brookfield viscosity of about 1.15 to 2000 centipoises.

Deyrup U.S. Pat. No. 3,492,250, in Example 4, discloses in a solution containing polyvinyl alcohol the presence of a polysaccharide thickener (Abbott Laboratories B 1459) together with Congo Red as the gelling agent. The solution of Example 4 does not contain a tetravalent titanium compound and the polysaccharide is a xanthan gum as disclosed in Whistler and Be Miller, Industrial Gums, second edition, Academic Press, New York, VII, 1. History on page 486, 1973. A repeat of Example 4 shows that the xanthan gum polysaccharide does not crosslink with the Congo Red gelling agent present in the solution. The Brookfield viscosity at 60 rpm of the solution of Example 4 containing Congo Red was found to be 70 centipoises while the Brookfield viscosity at 60 rpm of a solution without Congo Red was found to be 73 centipoises.

Deyrup U.S. Pat. No. 3,318,856 can be distinguished in that it teaches a system wherein polyvinyl alcohol is present with two different polyvinyl alcohol gelling agents, one gelling agent reinforcing the other. A polysaccharide is not present in the system. In Example 3 of said patent, boric acid functions as the initial gelling agent. Tetravalent titanium, present as potassium titanium oxalate, is the primary gelling agent used to form the rigid polyvinyl alcohol based foam described in Example 3 which has a Brookfield viscosity in excess of 2000 centipoises. The gelled skin formed in minutes on exposure to air also has a Brookfield viscosity in excess of 2000. Deyrup U.S. Pat. No. 3,492,250 in Column 4, lines 48 to 65, explains the function of two polyvinyl alcohol gelling agents including boric acid.

There has been some investigation of the use of mixtures of starch and polyvinyl alcohol as a surface size. This investigation was designed to explore the possibility of improving the quality of starch without a disproportionate increase in cost, or in lowering the cost of using polyvinyl alcohol without a disproportionate reduction in quality. These efforts, however, have been hindered by the general incompatibility of aqueous mixtures of starch and polyvinyl alcohol.

SUMMARY OF THE INVENTION

In accordance with this invention, mixtures of polyvinyl alcohol-polysaccharide microgel in water have been discovered which exhibit superior performance to polyvinyl alcohol microgels, particularly in uses such as the surface sizing of paper. A mixture of polyvinyl alcohol-polysaccharide microgel in water comprises water, and, based on the total mixture, about 0.1 to 10 percent by weight of a partially crosslinked mixture of polyvinyl alcohol and polysaccharide in which the mixture is partially crosslinked with titanium ions, said polyvinyl alcohol being present in the amount of about 0.05 to 9.95 percent by weight, said polysaccharide being present in the amount of about 0.05 to 9.95 percent by weight and being selected from the group consisting of about 0.05 to 9.95 percent by weight of starch and about 0.05 to 3 percent by weight of sodium carboxymethylcellulose, said microgel being a stable fluid derived from polyvinyl alcohol which has a Hoeppler viscosity of about 4 to 150 centipoises and in which at least about 50 mole percent of the monomeric units are vinyl alcohol units, the water and partially crosslinked mixture of polyvinyl alcohol and polysaccharide having a Brookfield viscosity of about 1.15 to 1000 centipoises, said viscosity being at least about 15 percent greater than the viscosity of the aqueous polyvinyl alcoholpolysaccharide mixture from which the microgel is derived.

DETAILED DESCRIPTION OF THE INVENTION

The mixture of polyvinyl alcohol-polysaccharide microgel in water of this invention is a stable fluid containing water and a partially crosslinked mixture of polyvinyl alcohol and polysaccharide. Although it is not intended that this invention be limited to any particular theory, it is believed that the microgels of this invention are entanglements of a partially crosslinked mixture of polyvinyl alcohol and polysaccharide chains possessing colloid-like properties dispersed in water.

The microgels of this invention have characteristics which distinguish them from prior art mixtures of starch and polyvinyl alcohol. These microgels contain a mixture of polyvinyl alcohol and polysaccharide which has been crosslinked sufficiently to increase the viscosity of the aqueous mixture by at least about 15 percent, but insufficiently to increase the viscosity above about 1000 centipoises. This intermediate amount of crosslinking is referred to herein as partial crosslinking. By "stable" is meant a product which is viscosity stable and stable against precipitation or layer separation for a period of at least two days. This period of stability is sufficient to allow the use of freshly prepared microgels in sizing applications.

The term "polyvinyl alcohol", as used throughout the specification and claims, refers to the product obtained by replacing all or a portion of the acyl groups in a polyvinyl ester with hydroxyl groups. Well-known methods of preparing polyvinyl alcohol include the hydrolysis, alcoholysis or saponification of a polyvinyl ester. Suitable polyvinyl esters include polyvinyl formate, polyvinyl acetate, polyvinyl propionate, polyvinyl butyrate, and the like. The preferred polyvinyl ester is polyvinyl acetate.

The polyvinyl alcohol used in accordance with this invention may be a homopolymer or a copolymer. When the polyvinyl alcohol is derived from a polyvinyl ester homopolymer, it is generally referred to as a polyvinyl alcohol homopolymer, regardless of whether it is partially or fully hydrolyzed; that is; whether only a portion or all of the acyl groups in the original polyvinyl ester have been replaced by hydroxyl groups.

When the polyvinyl alcohol is derived from a polyvinyl ester copolymer, it is generally referred to as a polyvinyl alcohol copolymer. The term "copolymer," as used throughout the specification and claims, is intended to include polymers derived from two or more copolymerizable monomers, for example, dipolymers, terpolymers, etc. The polyvinyl alcohol copolymer may be partially or fully hydrolyzed; that is, only a portion or all of the hydrolyzable acyl groups in the original copolymer may have been replaced by hydroxyl groups.

In any event, at least about 50 mole percent of the monomeric units in the resulting polyvinyl alcohol, whether it be a homopolymer or a copolymer, should be vinyl alcohol units. In the case of a polyvinyl alcohol homopolymer, this means that the polyvinyl alcohol should be at least about 50 mole percent hydrolyzed. When less than about 50 mole percent of the monomeric units in the polyvinyl alcohol are vinyl alcohol units, the polyvinyl alcohol may no longer have sufficient water solubility or hydroxyl functionality to be suitable for forming a microgel in accordance with this invention. Preferably, at least about 85 mole percent, and more preferably, at least about 93 mole percent of the monomeric units in the polyvinyl alcohol are vinyl alcohol units.

Any ethylenically unsaturated monomer which will copolymerize with vinyl acetate may be used for preparing polyvinyl alcohol copolymers. Typical monomers include alpha, beta-unsaturated aliphatic hydrocarbons such as ethylene, propylene, butylene, isobutylene, hexene, dodecene, octadecene, and the like; unsaturated lower-aliphatic mono- and di-carboxylic acids such as acrylic, methacrylic, maleic, maleic anhydride, fumaric, itaconic, and the like; loweralkyl esters of unsaturated lower-aliphatic mono- and dicarboxylic acids such as the methyl, ethyl, propyl, isopropyl, butyl, isobutyl, and tert.-butyl esters of acids such as acrylic, methacrylic, maleic, fumaric, itaconic, and the like; vinyl esters of saturated aliphatic acids such as vinyl formate, vinyl propionate, vinyl butyrate, vinyl pivalate, vinyl versatate, and the like; vinyl lower-alkyl esters such as methyl vinyl ether, ethyl vinyl ether, tert.-butyl vinyl ether, and the like; unsaturated aliphatic amides such as acrylamide, methacrylamide, dimethyl acrylamide, and the like; substituted amino lower-alkyl esters of unsaturated lower-aliphatic acids such as dimethylaminoethyl acrylate and methacrylate, diethylaminoethyl acrylate and methacrylate, diisopropylaminoethyl acrylate and methacrylate and the like; and unsaturated aliphatic amines such as vinylamine which is obtained by copolymerizing with vinyl succinimide and treating with strong caustic, and the like.

The molecular weight of the polyvinyl alcohol should be such as to provide a Hoeppler viscosity of about 4 to 150 centipoises. The Hoeppler viscosities referred to herein are measured as a 4% aqueous solution at 20°C. by the falling ball method using a Hoeppler viscosimeter. This procedure is described in the Hoeppler Precision Viscosimeter Operating Manual published by the Fish-Schurman Corp.

When the molecular weight of the polyvinyl alcohol corresponds to a viscosity of less than about 4 centipoises, uneconomically large amounts of crosslinking agent are necessary to cause microgel formation. When the molecular weight of the polyvinyl alcohol corresponds to a viscosity in excess of about 150 centipoises, formation of the microgel is difficult to control, in that significant amounts of solid gel are formed. Preferably the molecular weight corresponds to a Hoeppler viscosity of about 10 to 70 centipoises.

The preferred polyvinyl alcohols are those which have a Hoeppler viscosity of about 20 to 40 centipoises and in which at least about 93 mole percent of the monomeric units are vinyl alcohol units. One class of particularly preferred polyvinyl alcohols are homopolymers which are at least about 99 mole percent hydrolyzed. Another particularly preferred class of polyvinyl alcohols are copolymers derived about 94 to 98 percent by weight from vinyl acetate and about 2 to 6 percent by weight from methyl methacrylate and which are at least about 99 mole percent hydrolyzed.

The polysaccharides which are useful in accordance with this invention include starches and sodium carboxymethyl cellulose. The term "starch," as used herein, is intended to include natural starches of all descriptions, and derivatives thereof. Suitable starches include corn starch, potato starch, amylose starch, pearl starch, hydroxyethylated starches, oxidized starches, carboxymethylated starches, oxidized carboxymethylated starches, and the like. The degree of polymerization of sodium carboxymethyl cellulose is determined by measuring the Brookfield viscosity of an aqueous solution in accordance with test method D-1439-65 of the American Society for Testing Materials (ASTM).

The microgels of this invention comprise water and, based on the total fluid, about 0.1 to 10 percent by weight of a partially crosslinked mixture of about 0.05 to 9.95 percent by weight of polyvinyl alcohol and about 0.05 to 9.95 percent by weight of polysaccharide selected from the group consisting of about 0.05 to 9.95 percent by weight of starch and about 0.05 to 3 percent by weight of sodium carboxymethylcellulose.

When the microgel contains no components other than water and partially crosslinked mixture of polyvinyl alcohol and polysaccharide, the water content of the microgel is, of course, about 90 to 99.9 percent by weight. In this range of concentrations the microgels are readily applied and give satisfactory results in a variety of use applications. Preferably, the microgel contains about 1 to 8 percent of partially crosslinked mixture of polyvinyl alcohol and polysaccharide, and most preferably, about 2 to 6 percent.

The polyvinyl alcohol-polysaccharide microgels of this invention have Brookfield viscosities of about 1.15 to 1000 centipoises. This viscosity; that is, the viscosity of the water and partially crosslinked mixture of polyvinyl alcohol and polysaccharide, should be at least about 15 percent greater than the viscosity of the aqueous polyvinyl alcohol-polysaccharide mixture from which the microgel is derived. The percent increase in viscosity is determined by measuring the Brookfield viscosity of the aqueous polyvinyl alcohol-polysaccharide mixture at the same temperature and concentration before and after it is partially crosslinked to form the microgel. Preferably, the microgel has a Brookfield viscosity of about 25 to 1000 centipoises, and most preferably about 35 to 500 centipoises. The Brookfield viscosities referred to herein are determined at 25°C. using a Brookfield Viscometer, Model RVT, operating at 100 revolutions per minute as described in the manual from Brookfield Engineering Laboratories, Inc.

The polyvinyl alcohol-polysaccharide microgels of this invention may also contain other ingredients which make them especially suitable for a particular use. For example, when the microgel is to be used for paper or paperboard sizing, it may be desirable to incorporate a finely divided filler such as clay or calcium carbonate, or a pigment such as titanium dioxide.

The polyvinyl alcohol-polysaccharide microgels of this invention are prepared by partially crosslinking a mixture of polyvinyl alcohol and polysaccharide using tetravalent titanium ions as the crosslinking agent. Suitable sources of these ions are titanium complexes which may be added as such or formed in situ in the process. One class of suitable complexes includes titanium salts of chelating organic acids of 2 to 10 carbon atoms. Suitable organic acids include oxalic, malic, itaconic, lactic, tartaric, citric, salicylic, and the like. Such salts can be prepared in situ, for example, by reacting a tetraalkyl titanate such as tetraisopropyl titanate with the acid. It has been found that a little alcohol aids in keeping this salt in solution. In some cases, water-soluble fluorotitanates such as sodium fluotitanate, potassium fluotitanate, and the like may be used.

Another class of suitable titanium complexes includes titanium complexes with beta-diketones of the formula

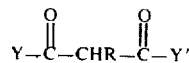

in which R is hydrogen, lower-alkyl or aryl, and Y and Y' are aryl, cycloalkyl or lower-alkyl. Typical beta-diketones of this structure include 2,4-pentanedione, 2,4-hexanedione, 2,4-heptanedione, 5-methyl-2,4-hexanedione, 2,4-octanedione, 5,5-dimethyl-2,4-hexanedione, 3-ethyl-2,4-pentanedione, 2,4-decanedione, 2,2-dimethyl-3,5-nonanedione, 3-methyl-2,4-pentanedione, 2,4-tridecanedione, 1-cyclohexyl-1,3-butanedione, 5,5-dimethyl-1,3-cyclohexanedione, 1,3-cyclohexanedione, 1-phenyl-1,3-butanedione, 1(4-biphenyl)-1,3-butanedione, 1-phenyl-1,3-pentanedione, 3-benzyl-2,4-pentanedione, 1-phenyl-5,5-dimethyl-2,4-hexane, 1-phenyl-2-butyl-1,3-butanedione, and dibenzoylmethane. The preferred beta-diketone is 2,4-pentanedione which complexes with titanium to form titanium acetylacetonate.

Another class of suitable titanium complexes includes titanium complexes with tri(hydroxylalkyl) amines in which the alkyl groups contain 2 to 6 carbon atoms. Typical examples include triethanol amine, triproponal amine, triisopropanol amine, tributanol amine, trihexanol amine, mixed hydroxylalkyl amines, and mixtures thereof.

The process of preparing the polyvinyl alcohol microgels of this invention comprises mixing (a) water, (b) 0.1 to 10 percent by weight of suitable mixture of polyvinyl alcohol and polysaccharide, based on the total fluid, and (c) titanium complex in an amount sufficient to provide 0.05 to 10 parts by weight of tetravalent titaniun ion per 100 parts of mixture of polyvinyl alcohol and polysaccharide. The titanium complex reacts with the dissolved polyvinyl alcohol and polysaccharide, thereby forming the microgel.

In some cases the pH must be adjusted before the titanium complex will react with the polyvinyl alcohol-polysaccharide mixture. For example, when using titanium salts of carboxylic acids such as potassium titanium oxalate or titanium citrate, the pH should be adjusted to about 6 to 10 and preferably about 7 to 9. Suitable water-soluble alkaline materials for controlling pH include the hydroxides and orthosilicates of alkali metals such as lithium, sodium, potassium, and the like; ammonium hydroxide; and the hydroxides of alkaline earth metals such as calcium, strontium, and barium; and the like. Sodium and ammonium hydroxides are preferred.

In the case of titanium lactate, pH control is not necessary for microgel formation, although more efficient use of the titanium ion can be achieved by pH control. Titanium complexes with beta-diketones such as titanium acetylacetonate also react directly with the polyvinyl alcohol-polysaccharide mixture to form microgels without adjustment of the pH. Dissolution of titanium acetylacetonate is assisted by the presence of a small amount of alcohol.

The specific amount of tetravalent titanium ion within the above range used to partially crosslink the polyvinyl alcohol-polysaccharide mixture will depend upon factors such as the concentration of the polyvinyl alcohol-polysaccharide, the molecular weight of the polyvinyl alcohol, the particular polysaccharide present, the desired final viscosity, etc. The amount should be controlled so as to provide a microgel having a Brookfield viscosity of about 15 to 1000 centipoises. In most cases about 0.2 to 2 parts by weight of tetravalent titanium ion is used per 100 parts of polyvinyl alcohol-polysaccharide mixture.

Since the microgels of this invention contain a large amount of water, it is not economical to transport them long distances. Moreover, they should be prepared only a short time before they are to be used, since they may not be stable for more than several days. Accordingly, it is preferred that these microgels be supplied on a commercial basis as a dry blend of microgel precursor ingredients. This method has the advantages of lower transportation costs, more uniform product quality, and minimal microgel preparation difficulties. For example, polyvinyl alcohol can be dry mixed with polysaccharide and a suitable solid titanium complex such as titanium citrate, titanium lactate or potassium titanium oxalate to form the commercial product.

A preferred precursor blend is one containing polyvinyl alcohol, polysaccharide and titanium citrate. When ready for use, this blend is dissolved in water, and sufficient base, such as ammonium hydroxide, is added to adjust the pH to 9 to 10, whereby the microgel is formed.

Another technique of preparing a dry microgel precursor mixture is to spray a finely divided, dry mixture of polyvinyl alcohol and polysaccharide with a suitable amount of a solution containing a titanium complex. For example, a solution containing a mixture of ethyl alcohol, lactic acid, and tetraisopropyl titanate may be used. The sprayed solution is adsorbed by the polyvinyl alcohol and polysaccharide powder which remains essentially dry. When ready for use, this product is dissolved in water with heating. It appears that the ingredients first react to form titanium lactate and then the microgel forms directly without need of pH adjustment.

The amount of tetravalent titanium ion which is required to form a microgel of a given viscosity is significantly reduced by the presence of starch or sodium carboxymethylcellulose is the polyvinyl alcohol solution. The amount of tetravalent titanium ion added, for example, up to 0.22 gram/200 gram sample is not sufficient to significantly increase the viscosity of the 1% polyvinyl alcohol or the 5% starch alone, but has a marked effect on the mixture of polyvinyl alcohol and starch. The tetravalent titanium ion has a much greater effect upon the viscosity of the mixture of 3% polyvinyl alcohol and 0.2% sodium carboxymethylcellulose than on the 3.2% polyvinyl alcohol or 0.2% sodium carboxymethylcellulose alone. When sodium carboxymethylcellulose alone is reacted with tetravalent titanium ions the viscosity begins to increase but a precipitate forms as the reaction proceeds.

The microgels of this invention are especially useful as sizes for paper and paperboard, in coatings, as textile warp sizes, and in adhesives. The application techniques for these uses are well known to those skilled in the art. In each case microgels are used in a manner similar to the manner in which polyvinyl alcohol solutions have been used except that these microgels may be used in lower polymer concentrations than polyvinyl alcohol solutions. The polyvinyl alcohol-polysaccharide microgels of this invention are particularly useful for sizing paper which is to be used for printing. The printing quality of such sized paper is superior to the printing quality of the same paper sized with the polyvinyl alcohol microgel described in Deyrup application Ser. No. 259,552, filed June 5, 1972.

EXAMPLES OF THE INVENTION

The following examples, illustrating the novel polyvinyl alcohol-polysaccharide microgels of this invention and the method of their preparation and use, are given without any intention that the invention be limited thereto. All parts and percentages are by weight.

EXAMPLE 1

To 200 grams of an aqueous solution having a Brookfield viscosity of 43 centipoises and containing 4.5% of hydroxyethylated corn starch and 1% of polyvinyl alcohol which was 99.5% hydrolyzed and had a Hoeppler viscosity of 30 centipoises was added 1.4 grams of a mixture containing equal amounts of ethyl alcohol, lactic acid, and tetraisopropyl titanate. The microgel produced by this addition had a Brookfield viscosity of 120 centipoises.

For comparison, 5.2 grams of the same ethyl alcohol-lactic acid-tetraisopropyl titanate mixture was added to 200 grams of an aqueous solution having a Brookfield viscosity of 30 centipoises containing 5% of the same hydroxyethylated corn starch. The resulting solution had a Brookfield viscosity of only 33 centipoises.

For further comparison, 3.7 grams of the same ethyl alcohol-lactic acid-tetraisopropyl titanate mixture was added to 200 grams of an aqueous solution having a Brookfield viscosity of 16 centipoises and containing 1% of the same polyvinyl alcohol. The resulting solution had a Brookfield viscosity of only 22 centipoises.

EXAMPLE 2

To 300 grams of an aqueous solution having a Brookfield viscosity of 56 centipoises containing 4% of oxidized corn starch and 2% of polyvinyl alcohol which was 99.5% hydrolyzed and had a Hoeppler viscosity of 30 centipoises was added 3.5 grams of a mixture of equal amounts of ethyl alcohol, lactic acid, and tetraisopropyl titanate. The microgel produced by this addition had a Brookfield viscosity of 195 centipoises.

For comparison, 4 grams of the same ethyl alcohol-lactic acid-tetraisopropyl titanate mixture was added to 300 grams of an aqueous solution containing 4% of the same oxidized corn starch and having a Brookfield viscosity of 28 centipoises. The resulting solution had a Brookfield viscosity of only 33 centipoises.

EXAMPLE 3

To 300 grams of an aqueous solution having a Brookfield viscosity of 94 centipoises containing 8.0% of hydroxyethylated starch and 1.0% of a polyvinyl alcohol which was 99.0% hydrolyzed and had a Hoeppler viscosity of 30 centipoises was added 0.06 gram of titanium acetylacetonate dissolved in 0.02 gram of isopropyl alcohol and 0.72 gram of methyl alcohol. The resulting microgel was uniform and had a Brookfield viscosity of 136 centipoises.

EXAMPLE 4

To 10 gallons of an aqueous solution containing 3.8% of hydroxyethylated starch and 1.1% of polyvinyl alcohol which was 99.5% hydrolyzed and had a Hoeppler viscosity of 30 centipoises was added a sufficient amount of a mixture containing equal parts of tetraisopropyl titanate, ethyl alcohol, and lactic acid to raise the Brookfield viscosity to 200 centipoises. The resulting microgel was used to size both sides of 37 pound per ream paper on a Beloit size press pilot coater operating at a constant speed of 250 feet per minute with the nip pressure of the applicator roll held at 8.1 psi. The coat weight was established as 1.7 pounds per ream. This paper was then printed on a lithographic offset press. There was essentially no linting or picking of paper fibers while the paper passed through the nip of the press, as evidenced by the condition of the blanket, both when applying ink to the paper (wet pick) and when running dry (dry pick).

For comparison, a sample of the same raw stock was sized on both sides under the same conditions with a 3.4% polyvinyl alcohol microgel derived from the same polyvinyl alcohol. The coat weight was 2.5 pounds per ream. When printed, this sample showed a greater amount of dry pick than the above polyvinyl alcohol-starch microgel sized sample.

EXAMPLE 5

To 300 grams of an aqueous solution having a Brookfield viscosity of 55 centipoises containing 3% of polyvinyl alcohol which was 99.5% hydrolyzed and had a Hoeppler viscosity of 30 centipoises and 0.2% of standard refined sodium carboxymethyl cellulose which had a Brookfield viscosity of approximately 3250 centipoises, measured as a 1% solution at 25°C., and was substituted by an average of approximately 0.75 sodium carboxymethyl groups per anhydroglucose unit was added 1 gram of a mixture of equal amounts of ethyl alcohol, lactic acid, and tetraisopropyl titanate. The microgel produced by this addition was a clear solution having a Brookfield viscosity of 150 centipoises.

For comparison, 1 gram of the same ethyl alcohol-lactic acid-tetraisopropyl titanate mixture was added to 300 grams of an aqueous solution having a Brookfield viscosity of 40 centipoises containing 3.2% of the same polyvinyl alcohol. The resulting solution had a Brookfield viscosity of only 50 centipoises.

For further comparison, 1 gram of the same ethyl alcohol-lactic acid-tetraisopropyl titanate mixture was added to 300 grams of an aqueous solution containing 0.2% of the sodium carboxymethyl cellulose and having a Brookfield viscosity of 24 centipoises. The resulting solution had a Brookfield viscosity of 24 centipoises.

EXAMPLE 6

To 300 grams of an aqueous solution having a Brookfield viscosity of 156 centipoises containing 1.0% of polyvinyl alcohol which was 99.5% hydrolyzed and had a Hoeppler viscosity of 30 centipoises, 2.0% of sodium carboxymethyl cellulose, and 3.0% of hydroxyethylated starch was added 0.24 gram of titanium acetylacetonate dissolved in 0.08 gram of isopropyl alcohol and 2.9 grams of methyl alcohol. The microgel produced by this addition was a uniform fluid having a Brookfield viscosity of 286 centipoises.

EXAMPLE 7

To 300 grams of an aqueous solution having a Brookfield viscosity of 122 centipoises containing 3% of pearl starch, 0.9% of polyvinyl alcohol which was 99.5% hydrolyzed and had a Hoeppler viscosity of 30 centipoises, and 0.1% of the sodium carboxymethyl cellulose described in Example 5 was added 0.7 gram of a mixture of equal parts of ethyl alcohol, lactic acid, and tetraisopropyl titanate. The resulting microgel had a Brookfield viscosity of 445 centipoises.

Sixteen point cylinder board was sized using the above microgel and a No. 15 Myer rod. To the sized cylinder board was applied a drop of water which took 24 minutes to penetrate completely. For comparison, a water drop applied to the unsized base stock took 11 minutes to penetrate completely.

For comparison, 3 grams of the same ethyl alcohol-lactic acid-tetraisopropyl titanate mixture was added to 300 grams of an aqueous solution having a Brookfield viscosity of 108 centipoises containing 3% of the same pearl starch and 0.1% of the same sodium carboxymethyl cellulose. The resulting solution had a Brookfield viscosity of only 110 centipoises.

For further comparison, 3 grams of the same ethyl alcohol-lactic acid-tetraisopropyl titanate mixture was added to 300 grams of an aqueous solution having a Brookfield viscosity of 78 centipoises containing 3% of the same pearl starch. The resulting solution had a Brookfield viscosity of 77 centipoises.

EXAMPLE 8

To 300 grams of an aqueous solution containing 1% of a high molecular weight polyvinyl alcohol which was 99% hydrolyzed and had a Hoeppler viscosity of 60 centipoises and 4.5% of a hydroxyethylated corn starch and having a Brookfield viscosity of 46 centipoises was added 1.2 grams of a mixture containing equal amounts of ethyl alcohol, lactic acid, and tetraisopropyl titanate. The microgel produced by this addition was a viscous solution having a Brookfield viscosity of 935 centipoises.

For comparison, 2.9 grams of the ethyl alcohollactic acid-tetraisopropyl titanate mixture was added to 300 grams of an aqueous solution containing 1% of the same polyvinyl alcohol and having a Brookfield viscosity of 20 centipoises. The resulting solution had a Brookfield viscosity of only 44 centipoises.

EXAMPLE 9

Three hundred grams of an aqueous solution was prepared which contained 4.5% of a hydroxyethylated corn starch and 1% of a copolymer containing 96% vinyl alcohol and 4% methyl methacrylate. This copolymer was 99% hydrolyzed and had a Hoeppler viscosity of 30 centipoises. The aqueous solution containing the hydroxyethylated corn starch and copolymer had a Brookfield viscosity of 41 centipoises. To this solution was added 2.0 grams of a mixture containing equal amounts of ethyl alcohol, lactic acid, and tetraisopropyl titanate. The microgel produced by this addition was a viscous solution having a Brookfield viscosity of 305 centipoises.

For comparison, 2.9 grams of the ethyl alcohol-lactic acid-tetraisopropyl titanate mixture was added to 300 grams of an aqueous solution containing 1% of the same copolymer and having a Brookfield viscosity of 20 centipoises. The resulting solution had a Brookfield viscosity of only 20 centipoises.

I claim:

1. A mixture of polyvinyl alcoholpolysaccharide microgel in water comprising water and, based on the total mixture, 0.1 to 10 percent by weight of a partially crosslinked mixture of polyvinyl alcohol and polysaccharide in which the mixture is partially crosslinked with a titanium complex containing tetravalent titanium ions in an amount of 0.05 to 10 parts by weight per 100 parts of said mixture of polyvinyl alcohol and polysaccharide, said polyvinyl alcohol being present in the amount of 0.05 to 9.95 percent by weight, said polysaccharide being present in the amount of 0.05 to 9.95 percent by weight and being selected from the group consisting of 0.05 to 9.95 percent by weight of starch and 0.05 to 3 percent by weight of sodium carboxymethylcellulose, said microgel being a stable fluid derived from polyvinyl alcohol which has a Hoeppler viscosity of 4 to 150 centipoises and in which at least 50 mole percent of the monomeric units are vinyl alcohol units, the water and partially crosslinked mixture of polyvinyl alcohol and polysaccharide having a Brookfield viscosity of 1.15 to 1000 centipoises, the viscosity being at least 15 percent greater than the viscosity of the aqueous polyvinyl alcohol-polysaccharide mixture from which the microgel is derived.

2. A mixture of polyvinyl alcoholstarch microgel in water comprising water and, based on the total mixture, 0.1 to 10 percent by weight of a partially crosslinked mixture of polyvinyl alcohol and starch in which the mixture is partially crosslinked with a titanium complex containing tetravalent titanium ions in an amount of 0.05 to 10 parts by weight per 100 parts of said mixture of polyvinyl alcohol and polysaccharide, the polyvinyl alcohol being present in the amount of 0.05 to 9.95 percent by weight, and the starch being present in the amount of 0.05 to 9.95 percent by weight, the microgel being a stable fluid derived from polyvinyl alcohol which has a Hoeppler viscosity of 4 to 150 centipoises and in which at least 50 mole percent of the monomeric units are vinyl alcohol units, the water and partially crosslinked mixture of polyvinyl alcohol and starch having a Brookfield viscosity of 1.15 to 1000 centipoises, the viscosity being at least 15 percent greater than the viscosity of the aqueous polyvinyl alcohol-starch mixture from which the microgel is derived.

3. The polyvinyl alcohol-starch microgel of claim 2 in which the microgel contains 1 to 8 percent by weight of a partially crosslinked mixture of polyvinyl alcohol and starch, the polyvinyl alcohol has a Hoeppler viscosity of 10 to 70 centipoises, at least 85 mole percent of the monomeric units in the polyvinyl alcohol are vinyl alcohol units, and the microgel has a Brookfield viscosity of 25 to 1000 centipoises.

4. The polyvinyl alcohol-starch microgel of claim 3 in which the microgel contains 2 to 6 percent by weight of a partially crosslinked mixture of polyvinyl alcohol and starch, the polyvinyl alcohol has a Hoeppler viscosity of 20 to 40 centipoises, at least 93 mole percent of the monomeric units in the polyvinyl alcohol are vinyl alcohol units, and the microgel has a Brookfield viscosity of 30 to 500 centipoises.

5. The polyvinyl alcohol-starch microgel of claim 4 in which the polyvinyl alcohol is a homopolymer which is at least 99 mole percent hydrolyzed.

6. The polyvinyl alcohol-starch microgel of claim 4 in which the polyvinyl alcohol is a copolymer derived 94 to 98 percent by weight from vinyl acetate and 2 to 6 percent by weight from methyl methacrylate and is at least 99 mole percent hydrolyzed.

7. The polyvinyl alcohol-starch microgel of claim 2 in which 0.05 to 3 percent by weight of starch has been replaced by 0.05 to 3 percent by weight of sodium carboxymethylcellulose.

8. The polyvinyl alcohol-starch microgel of claim 3 in which 0.05 to 3 percent by weight of starch has been replaced by 0.05 to 3 percent by weight of sodium carboxymethylcellulose.

* * * * *